UNITED STATES PATENT OFFICE.

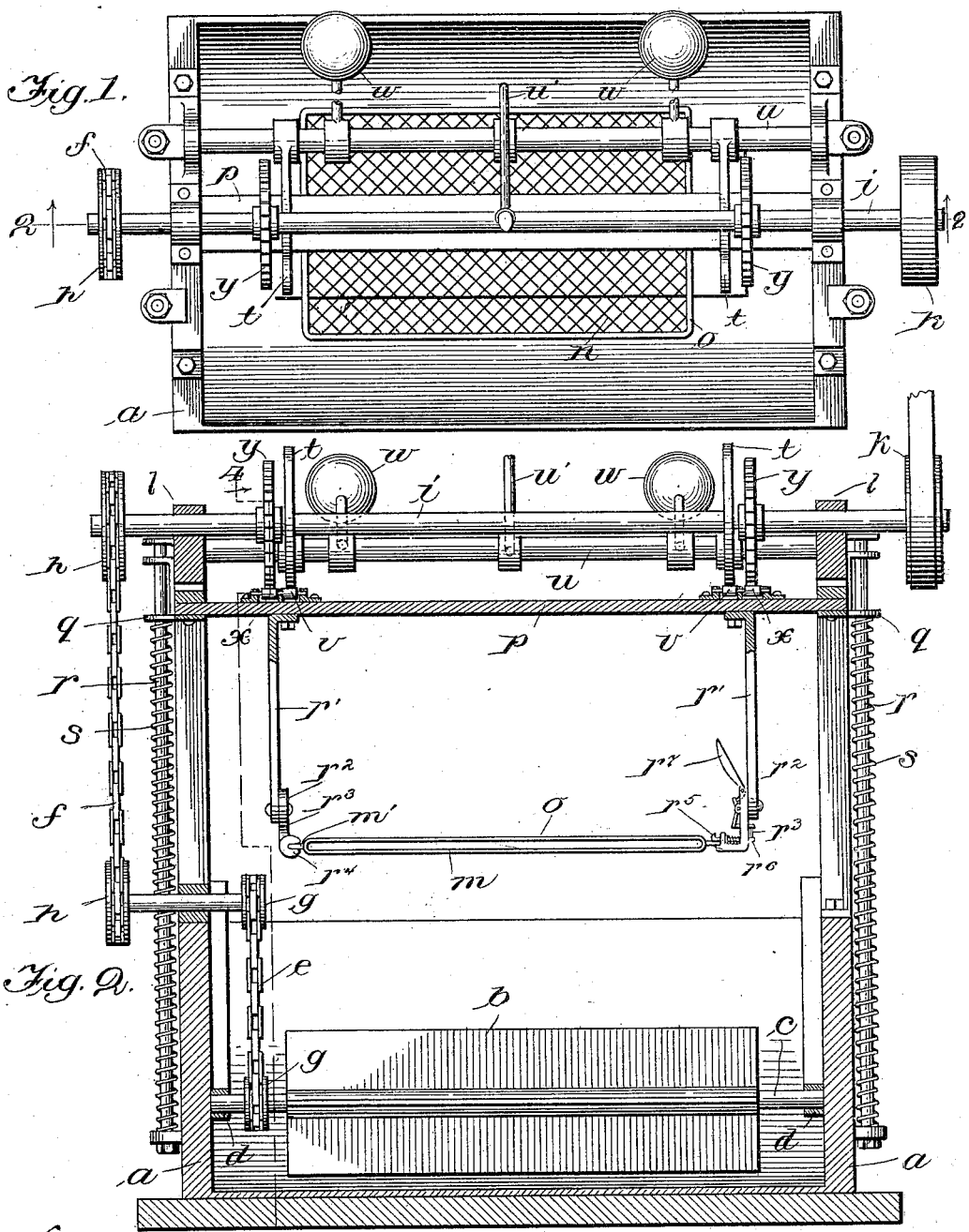

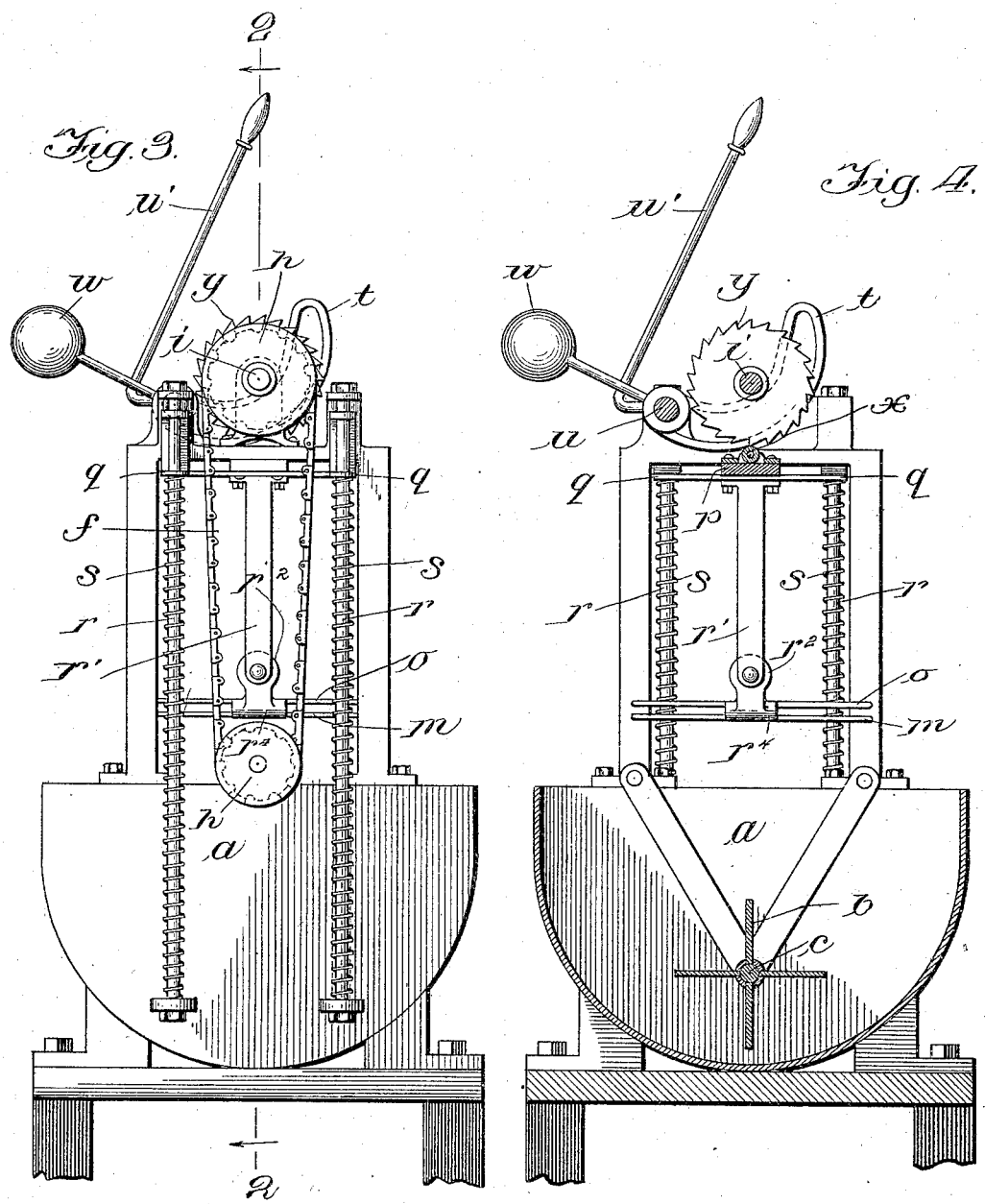

WILLIAM S. FOSTER, OF RACINE, WISCONSIN, ASSIGNOR TO RACINE MACHINERY MANUFACTURING COMPANY, OF RACINE, WISCONSIN, A CORPORATION OF WISCONSIN.

DIPPING-MACHINE.

SPECIFICATION forming part of Letters Patent No. 725,064, dated April 14, 1903.

Application filed October 23, 1902. Serial No. 128,372. (No model.)

*To all whom it may concern:*

Be it known that I, WILLIAM S. FOSTER, a citizen of the United States, residing at Racine, in the county of Racine and State of Wisconsin, have invented a certain new and useful Improvement in Dipping-Machines, of which the following is a full, clear, concise, and exact description, reference being had to the accompanying drawings, forming a part of this specification.

My invention relates to candy-making machinery, and has for its object the provision of a dipping-machine that is adapted to coat pieces of candy with some desired adhesive substance, as chocolate.

In practicing my invention I employ an elevator in association with a dipping vat or receptacle containing the material that is to form the coating. This elevator is provided with a pan that preferably detachably forms a part thereof and which is rotatable in the elevator structure, so that in one position it will serve to carry the candy into the coating material and in an alternative position will enable the candy to drop off into a tray temporarily placed beneath the pan. There is also associated with the elevator mechanism a tapping or shaking device brought into operative action when the elevator withdraws the pan from the chocolate or other coating material, the shaking mechanism being preferably out of operative service when the pan is within the dipping-vat. The shaking mechanism also aids in removing the candy from the pan.

I will explain my invention more fully by reference to the accompanying drawings, illustrating the preferred embodiment thereof, in which—

Figure 1 is a plan view of a machine embodying my invention; Fig. 2, a sectional elevation thereof on line 2 2 of Fig. 1. Fig. 3 is a side elevation of the machine, and Fig. 4 is a cross-sectional view on line 4 4 of Fig. 2.

Like parts are indicated by similar characters of reference throughout the different figures.

The vat $a$ is preferably semicylindrically-shaped and of a size sufficient to contain enough coating material to last many operations of the apparatus. Within the vat is preferably located a stirrer $b$, preferably in the form of vanes mounted upon a rotating shaft $c$, that is journaled in bearings $d$ $d$, that may be located upon the inner sides of the end walls of the vat. The stirrer is driven by sprocket-chains $e$ and $f$ in driving engagement with sprocket-wheels $g$ $g$ and $h$ $h$.

The sprocket-chain $f$ is in driving engagement with an operating or main driving shaft $i$, actuated by a belt-driven pulley $k$. The stirring of the material within the vat is thus preferably constantly carried on, irrespective of the operation of the remainder of the apparatus. Bearing-standards $l$ $l$ project above the vat, the bearings for the shaft $i$ being located on these standards. The pan $m$ may be of any desired construction, that shown being preferred. In the form of pan shown its bottom is perforated by being formed of a screen $n$, upon which the candy may rest, and a rim $o$ is provided for holding the candy upon the screen. This pan is mounted upon a vertically-sliding cleat, support, or carrier, $p$, provided at its side margins with guides $q$, that travel upon vertical guide-rods $r$ $r$. The pan is supported by hangers $r'$, depending from the carrier $p$. The lower ends of these hangers are preferably provided with coaxially-arranged pivoted bearings $r^2$ $r^2$ for the pan, which bearings carry rotatable pan-supports $r^3$ $r^3$, with which the pan has separable connection, whereby one pan may be filled with candy apart from the machine and substituted for that in the machine having candy which has been dipped. I prefer the means illustrated for removably securing the pans in place. I provide the rotatable supports with retaining means $r^4$ $r^5$, the device $r^4$ having jaws between which a projection $m'$, carried upon the pan $m$, may be inserted. The device $r^5$ is preferably of the form illustrated, including a spring-actuated detent $r^6$, operable by a lever $r^7$, serving to fasten and permit the release of the pan.

Springs $s$ $s$, surrounding the rods $r$ $r$, engage the guides $q$ $q$ underneath the same and serve to lift the pan $m$ from the dipping-vat. To depress the pan into the vat, I provide an actuating mechanism that preferably includes operating-cams *t t*, rigidly secured upon an operating or crank shaft *u*, having a crank or operating handle *u'*. These cams engage the pan-carrier *p* preferably through the agency of cam-rollers *v v*, mounted upon said carrier. When the handle *u'* is depressed, the cams *t* are borne against the rollers *v v* to depress said support against the force of the springs *s s*. A reverse movement of the handle will obviously permit of the elevation of the pan, the springs *s* then distending themselves. To assist in the elevation of the pan and its carrier *p*, I provide counterweights *w w*, rigidly secured to the operating-shaft *u*. After the pan has been elevated rollers *x x*, also provided upon the carrier *p*, are brought into contact with rotating wheels *y y*, having irregular peripheries to cause the rapid vibration of the carrier *p* and the candy-pan to shake the excess of dipping material from the candy, after which the pan may be inverted to pour its contents into a tray temporarily inserted beneath the same. Any candy that might otherwise stick to the pan when inverted will be shaken therefrom by the action of the wheels or cams *y y*. The wheels may very desirably be in the form of ratchet-wheels whose teeth engage the cam-rollers to force the rapid vertical vibration of the candy-pan. They are preferably constantly in operation, and to this end may be mounted upon an element driven by the pulley *k*, preferably the main shaft *i*.

It will be seen how very simple and effective is the machine of my invention, the only manual operations being the manipulation of the handle *u* and the pan *m*.

It is obvious that changes may be made in the machine shown without departing from the spirit of my invention, nor do I wish to be limited to any use that the machine may be put to.

Having thus described my invention, I claim as new and desire to secure by Letters Patent—

1. In a dipping-machine, the combination with a dipping-vat, of a pan-carrier located above the same, guides for the pan-carrier to direct the pan into and out of the vat, springs for elevating the pan-carrier, cam mechanism for depressing the same, and mechanism for shaking the pan-support and operatively engaging said support when it is elevated, substantially as described.

2. In a dipping-machine, the combination with a dipping-vat, of a pan-carrier located above the same, rods for guiding said carrier in vertical travel, cam mechanism for depressing the carrier, springs for elevating the carrier, and a rotating ratchet or cam wheel *y* engaging the carrier to vibrate the same, substantially as described.

3. In a dipping-machine, the combination with a dipping-vat, of a pan-carrier located above the same, rods for guiding said carrier in vertical travel, cam mechanism for depressing the carrier, springs for elevating the carrier, and a rotating ratchet or cam wheel *y* engaging the carrier to vibrate the same, and a rotatable mounting for the pan, substantially as described.

In witness whereof I hereunto subscribe my name this 3d day of October, A. D. 1902.

WILLIAM S. FOSTER.

Witnesses:
CHAS. A. GIBEIN,
LEO A. PEIL.